Oct. 25, 1938.  E. J. POITRAS ET AL  2,134,488

YIELDABLE DRIVE COUPLING

Filed April 5, 1935

INVENTORS
Edward J. Poitras
James D. Tear
BY
THEIR ATTORNEY

Patented Oct. 25, 1938

2,134,488

UNITED STATES PATENT OFFICE 2,134,488

YIELDABLE DRIVE COUPLING

Edward J. Poitras, Jackson Heights, and James D. Tear, Great Neck, N. Y., assignors to Ford Instrument Company, Inc., Long Island City, N. Y., a corporation of New York Application April 5, 1935, Serial No. 14,814

6 Claims. (Cl. 192—150)

This invention relates generally to yieldable drive couplings between driving and driven members, and more particularly to such couplings which tend to hold the members in positional or angular agreement, and yet function to yield at some given or predetermined torque and permit relative rotation between the members against a retractile force.

A cam mechanism is most serviceable for this purpose where a cam follower carried by one of the members is urged by a spring pressure toward the low point of a cam on the other member, the coaction of the cam and its follower constituting the sole drive connection. With such construction there are two factors determining the torque at which the connection will yield, namely, the tension of the spring and the rise or slope of the cam.

For most uses to which such drive connections are put, delicacy and precision of operation are essential. They should themselves impose a minimum of drag on accelerations and decelerations of the driving member, and there should be a prompt and accurate restoration of positional agreement between the members as soon as the torque transmitted permits. It is therefore desirable that the inertia of the elements of the coupling be kept at a minimum.

Commonly the cam mechanism heretofore used for this purpose has been of the heart cam type. A heart cam is fixed on the axis of one of the members and rotates therewith, and a roller against the edge of the cam constitutes the cam follower, being carried by the other member and urged by a spring into engagement with the cam. The mounting for the cam follower is a pivoted arm extending more or less tangentially of the cam to afford proper range of movement.

Since the moment of inertia of a rotatable body varies in accordance with its mass and the square of its radius of gyration, it is obvious that the inertia of the heart cam type of mechanism must be considerable. Being a constant rise cam it follows that for a given radius of the low point the size of the cam, or to put it another way, the radius of the high point, depends upon the cam gradient. The square of the radius of gyration of the cam is substantially greater than the square of the minimum radius. Likewise the follower part of the cam mechanism has considerable inertia due to its design including the tangential arm on which the follower is mounted, sufficient to cause an overrunning of the low point of the cam when it is released to return to positional agreement and a consequent oscillation until the momentum is dissipated in the retractile spring.

The purpose of this invention is to provide a cam mechanism for this purpose the inertia of which will be sufficiently low to obviate the disadvantages above mentioned and which will nevertheless possess all the requisites of such a coupling.

The invention may chiefly be characterized by the fact that the cam surface is of uniform radius and has an axial instead of a radial rise, and the follower pivots about an axis transverse to the axis of rotation. Such construction minimizes the radius of gyration of both elements and the inertia of the cam and cam follower of the drive coupling of this invention is thus made considerably less than the same elements of such drive couplings as have been heretofore used. The reduction of the total inertia of the drive coupling reduces the reaction torque on the driving member on accelerations, decelerations and changes in the direction of the driving member. The reduced inertia of the cam follower and its associated parts raises its frequency of oscillation in seeking the low point of the cam. Consequently, the cam follower has comparatively high damping and, therefore, settles at the low point of the cam in a comparatively short time.

For the purpose of illustration the coupling is shown as controlling a servo-motor in response to the operation of a receiver motor of a selsyn transmission, but its wide utility in many forms of transmissions will be readily apparent to those skilled in the art.

The invention will now be more particularly described by reference to the embodiment illustrated in the drawing, and will be thereafter pointed out in claims.

Figure 1:
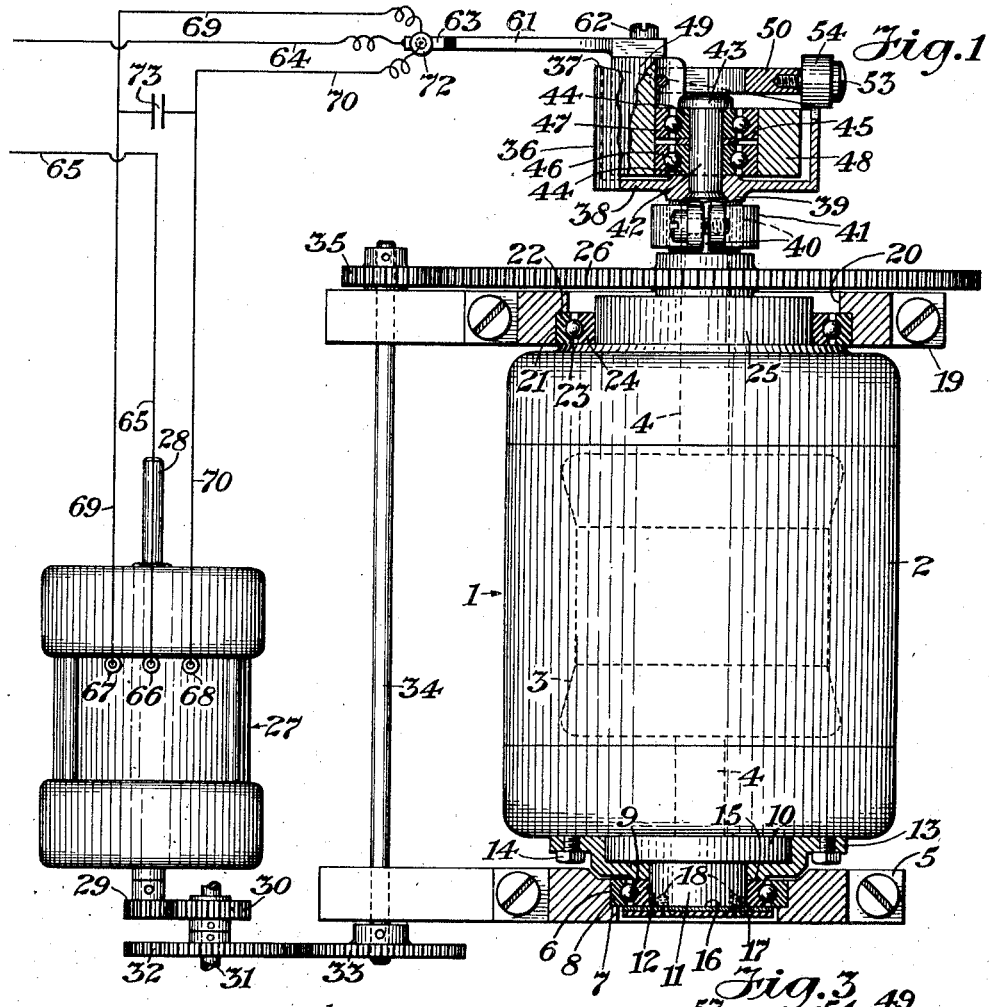
Fig. 1 is an assembly partly diagrammatic showing the structural elements in elevation with the cam mechanism and certain other parts partly in section.

1 indicates generally an electrical receiver motor of a signal transmission system, the windings and circuit connections being omitted for the sake of simplicity. The receiver includes a stator 2 rotatably mounted between a pair of fixed supporting frames and a rotor 3 having a shaft 4 rotatably mounted within the stator in any suitable manner. For the purpose of supporting the stator against radial and end thrusts there is provided a lower fixed frame 5 having a circular aperture 6 formed with a recess 7 for receiving an outer race 8 coacting with the balls 9 of a ball bearing. The bottom of the casing of the stator is provided with a circular extension 10 of reduced diameter which in turn is provided with a circular extension 11 of still lesser diameter. The extension 11 has attached to it in any suitable manner the inner race 12 for the balls 9 of the ball bearing. An annular member 13 is fitted over the extension 10 and held in place by screws 14 passing in to the casing of the stator. A clearance is provided between the member 13 and the adjacent surfaces of the frame 5 and the outer race 8, but as indicated at 15 the member is provided with a boss engaging the upper face of the inner race 12. A plate 16 of felt or the like and a plate 17 of metal are held in place beneath the ball bearing by screws 18 threaded into the extension 11.

As a further support for the rotatable stator there is provided a fixed upper frame 19 having a circular aperture 20 with a recess 21 in which is fastened an outer race 22 coacting with the balls 23 of a ball bearing, the inner race 24 of which is attached to a circular extension 25 at the top of the casing of the stator, which extension in turn carries a gear 26.

A reversible electric servo-motor 27, which is shown as a single phase induction motor of the capacitor type, has its rotor shaft 28 provided with a pinion 29 at its lower end which engages a pinion 30 attached to a suitably mounted shaft 31. This shaft carries a gear 32 engaging a gear 33 on the lower end of a shaft 34 mounted in the frames 5 and 19 and carrying at its upper end a pinion 35 engaging the gear 26 attached to the stator. Energization of the servo-motor over the circuits to be hereinafter described will cause, through the gear train just described, rotation of the stator in the frames 5 and 19 in one or the other direction according to the direction of rotation of the servo-motor. The output of the apparatus is taken off from the shaft 31.

The coupling or cam mechanism of this invention includes a cylindrical member 36 provided at one end with a cam surface 37 disposed in a plane which is oblique to the longitudinal axis of the member, the cam surface being therefore radially equidistant from its axis of rotation and having an axial instead of a radial rise as is the case with a heart-shaped cam. By virtue of these characteristics, the cam is also of the constant rise type.

The other end of the cylindrical member 36 is provided with a web 38 which carries a tubular extension 39 adapted to fit over one end of the shaft 4 of the rotor and having a plurality of slots 40 to permit the extension to be tightly clamped on the shaft by means of a clamp 41. The web is also provided with a central aperture through which passes a stud 42 having a rivet head countersunk in a correspondingly shaped recess in the web at the inner end of the extension 39. The stud is provided with a head 43 between which and the web 38 are confined the inner races 44 of a pair of ball bearings and a spacing washer 45. The balls 46 of the bearings also coact with a pair of outer races 47 fixed to the bore wall of an annular hub 48 which is accordingly mounted concentrically with respect to the cylindrical member 36 and lies substantially within the member, except for a projection 49 extending beyond the cam surface 37.

Figures 2, 3:
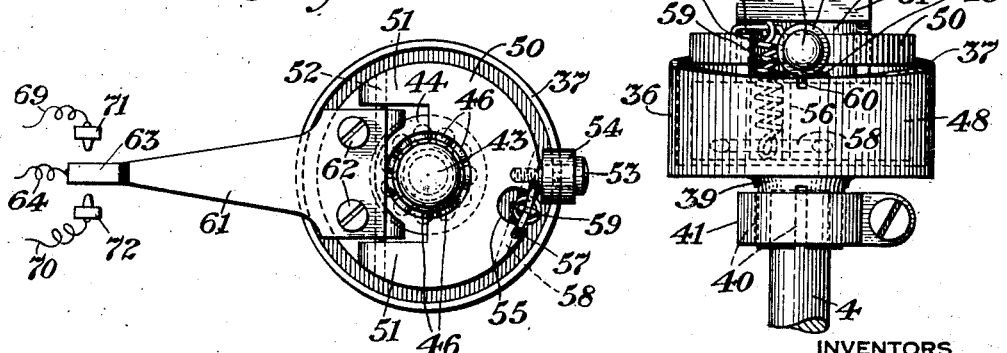
Fig. 2 is a plan of the cam mechanism.
Fig. 3 is an elevation of the cam mechanism to show more clearly the contour of its cam surface.

An arm in the form of an arcuate plate 50 has a portion cut away, as shown most clearly in Fig. 2, to provide a pair of prongs 51 lying adjacent to the side faces of the projection 49. A rod 52 passes through the projection and extends into holes in the prongs, whereby the arm 50 is pivotally connected to the projection 49 of the hub. The arm carries a stud 53 on which is rotatably mounted a roller 54 constituting a follower coacting with the cam surface 37. The arm 50 is provided with a peripheral recess 55 and the hub 48 has a corresponding recess 56 in line with that in the arm. A bar 57 attached to the arm 50 spans the top of the recess 55 therein, while a bar 58 is attached to the hub 48 and spans the bottom of the recess 56. A spring 59 connected between the bars 57 and 58 holds the follower 54 against the cam surface 37. The cam surface, as shown most clearly in Fig. 3, is provided with a notch 60 at what will hereinafter be designated the low point of the cam surface, this point being the one engaged by the follower under normal conditions of operation as will be more fully explained hereinafter. The periphery of the follower enters the notch slightly and therefore bears against the corners at the open end of the notch.

An arm 61 is attached by screws 62 to the top of the projection 49 and has at its free end a conducting element 63 insulated from the rest of the arm. A conductor 64 connected to the element leads to a suitable source of single phase current. The other supply conductor 65 is connected to a terminal 66 common to the stator windings of the servo-motor 27. The other terminals 67 and 68 of the windings are connected by conductors 69 and 70 to fixed contacts 71 and 72 respectively, arranged to be selectively engaged by the conducting element 63 in the operation of the apparatus. A condenser or capacitor 73 is connected between the conductors 69 and 70.

In considering the operation of the apparatus described above it will be assumed that the parts initially occupy the positions shown in the drawing; that is, the follower 54 engages the cam surface 37 at its low point and rests upon the two corners of the notch 60. The arm 61 is positioned so that its contact element 63 lies midway between the fixed contacts 71 and 72 and hence the servo-motor 27 is deenergized. A certain electrical relation or balance will exist between the stator 2 and the rotor 4 of the receiver 1 under these conditions.

If now the existing electrical relation in the receiver be altered by manipulation of the transmitter to which it is connected the rotor 3 will turn with respect to the stator 2 to reestablish the electrical balance. The movement of the rotor will be imparted to the cylindrical member 36 attached to the shaft of the rotor. The slope of the cam surface 37, the size of the notch 60 and the tension of the spring 59 will be so designed as to cause the follower 54 to maintain its normal relation to the cam surface during the initial movement of the rotor. In other words, the device will then act as a rigid driving connection between the cylindrical member 36 and the hub 48 to correspondingly turn the latter and the arm 61 attached thereto until its contact element 63 engages one or the other of the fixed contacts 71 or 72. The restraint thus offered to the movement of the arm will stop the movement of the hub 48 and the follower 54 connected thereto but under the influence of continued movement of the rotor of the receiver the cylindrical member 36 will continue to rotate and the follower will depart from its normal position with respect to the cam surface and ride up on the latter.

Assuming that the arm 61 moves in a clockwise direction as viewed in Fig. 2 the engagement of the contact element 63 with the fixed contact 71 will establish a circuit through the supply conductor 64, contact element 63, fixed contact 71, conductor 69, the winding of the servo-motor 27 connected between the terminals 67 and 66 and the other supply conductor 65. The resulting energization of the motor 27 will cause its rotor to rotate and through the shaft 28, pinions 29 and 30, shaft 31, gears 32 and 33, shaft 34, pinion 35 and gear 26, the stator 2 of the receiver will be turned in its frames 5 and 19.

The rotation of the stator is in a direction opposite to the initial rotation of the rotor and continues so long as electrical impulses are being transmitted from the transmitter. When the transmission ceases the stator continues to turn only just far enough to restore the electrical balance with the rotor and thereafter to break the electrical contact and deenergize the servo-motor.

The rotor follows the stator after the restoration of the electrical balance and turns in a direction opposite to its initial movement to move the contact element 63 away from the fixed contact 71, the cam follower 54 meanwhile returning to the low point of the cam surface 37 under the influence of the spring 59. It is important that the moment of inertia of the follower part of the cam mechanism shall be of such magnitude as not to cause the cam follower to overrun the low point of the cam surface and thus produce oscillations or hunting of the servo-motor. This desirable result is effected by the type of cam mechanism shown and described. Likewise it is important when the initial impulse is received from the transmitter that the rotor respond accurately and promptly. A cam mechanism of the type illustrated and described has a sufficiently small moment of inertia due to the relatively short radius of gyration that no substantial inertia drag is imposed upon the rotor.

We claim:

1. A drive coupling comprising the combination of coaxial driving and driven members, a cylindrical cam concentrically mounted on one member with its cam surface on one end radially equidistant from its axis of rotation, a follower arm pivoted to the other member on a pivot transverse of the axis of rotation, a follower on the free end of the arm adapted to engage the cam surface, and resilient means urging the follower toward the cam surface.

2. A drive coupling comprising the combination of rotative driving and driven members, a hollow cylindrical element concentrically connected to one of the members and terminating in a cam surface, a part connected to the other member and partially disposed within the cylindrical element, a follower arm pivotally attached to the part, a follower on the free end of the arm and resilient means connected between the follower arm and the part for holding the follower in engagement with the cam surface.

3. A drive coupling comprising the combination of rotative driving and driven members, a hollow cylindrical cam concentrically connected at one end to one member and having a cam surface at the other end radially equidistant from its axis of rotation, an element connected to the other member and partially disposed within the hollow cam for relative rotation about the axis of rotation of the cam, a follower arm pivoted to the element on a pivot transverse of said axis of rotation, a follower on the free end of the arm adapted to engage the cam surface and resilient means urging the follower toward the cam surface.

4. A drive coupling comprising the combination of rotative driving and driven members, a cup-shaped element attached to and concentrically disposed with respect to one of the members the open end of which constitutes a cam surface, a stud axially disposed within the element, a hub mounted on the stud, means for connecting the other member to the hub, a follower arm pivotally attached at one end to the hub and extending transversely to the axis of the stud, a follower on the free end of the arm and resilient means connected between the hub and the arm for holding the follower in engagement with the cam surface.

5. A drive coupling comprising the combination of rotative driving and driven members, an element connected to one of the members and provided with a cam surface which is radially equidistant from the axis of rotation of the member, a follower pivoted to the other member for rotation therewith and for movement in a plane containing the axis of rotation of the first member and resilient means for holding the follower in engagement with the cam surface.

6. A drive coupling comprising the combination of rotative driving and driven members, a cylindrical element concentrically mounted on one member and having a cam surface at one end radially equidistant from its axis of rotation, a part attached to the other member and arranged for relative movement with respect to the cylindrical element about said axis of rotation, a follower arm pivotally connected to the part at one side of its axis of rotation, a follower attached to the free end of the arm and adapted to engage the cam surface at a point diametrically opposite the pivot of the follower arm and resilient means for holding the follower in engagement with the cam surface.

EDWARD J. POITRAS.
JAMES D. TEAR.